(12) United States Patent
Sloane et al.

(10) Patent No.: US 12,375,474 B2
(45) Date of Patent: *Jul. 29, 2025

(54) SYSTEM FOR SECURED ELECTRONIC DATA ACCESS THROUGH MACHINE-LEARNING BASED ANALYSIS OF COMBINED ACCESS AUTHORIZATIONS

(71) Applicant: BANK OF AMERICA CORPORATION, Charlotte, NC (US)

(72) Inventors: Brandon Sloane, Indian Land, SC (US); James Thomas MacAulay, Erie, CO (US)

(73) Assignee: BANK OF AMERICA CORPORATION, Charlotte, NC (US)

(*) Notice: Subject to any disclaimer, the term of this patent is extended or adjusted under 35 U.S.C. 154(b) by 0 days.

This patent is subject to a terminal disclaimer.

(21) Appl. No.: 18/648,419

(22) Filed: Apr. 28, 2024

(65) Prior Publication Data

US 2024/0283787 A1 Aug. 22, 2024

Related U.S. Application Data

(63) Continuation of application No. 17/725,017, filed on Apr. 20, 2022, now Pat. No. 12,015,604.

(51) Int. Cl.
*H04L 9/40* (2022.01)
*H04L 41/16* (2022.01)

(52) U.S. Cl.
CPC ............ *H04L 63/083* (2013.01); *H04L 41/16* (2013.01); *H04L 63/0428* (2013.01)

(58) Field of Classification Search
CPC .... H04L 63/083; H04L 63/0428; H04L 41/16
See application file for complete search history.

(56) References Cited

U.S. PATENT DOCUMENTS

| | | |
|---|---|---|
| 8,316,237 B1 | 11/2012 | Felsher et al. |
| 8,639,625 B1 | 1/2014 | Ginter et al. |
| 8,843,997 B1 | 9/2014 | Hare |
| 9,349,016 B1 | 5/2016 | Brisebois et al. |
| 10,043,035 B2 | 8/2018 | Lafever et al. |
| 10,270,592 B1 | 4/2019 | Ghetti et al. |
| 10,454,934 B2 | 10/2019 | Parimi et al. |
| 10,726,491 B1 | 7/2020 | Hockey et al. |
| 10,839,020 B2 | 11/2020 | Shah |
| 10,963,786 B1 | 3/2021 | Taylor et al. |
| 10,984,913 B2 | 4/2021 | Shah |

(Continued)

*Primary Examiner* — Hee K Song
(74) *Attorney, Agent, or Firm* — Moore & Van Allen PLLC; Nicholas C. Russell

(57) ABSTRACT

A system is provided for secured electronic data access through machine-learning based analysis of combined access authorizations. In particular, the system may maintain an access provisioning database which stores data regarding the data access authorizations that have been granted to one or more third party computing systems or entities. The system may further continuously monitor and aggregate electronic data from one or more electronic data streams and analyze the electronic data to intelligently generate probabilities for future events that create certain combinations of access authorizations that affect the security of the electronic data to which the third party computing systems have authorized access. In this way, the system may provide an effective way to manage access authorizations.

20 Claims, 2 Drawing Sheets

(56) References Cited

U.S. PATENT DOCUMENTS

| | | |
|---|---|---|
| 11,030,341 B2 | 6/2021 | Lafever et al. |
| 11,165,800 B2 | 11/2021 | Thampy |
| 11,207,584 B2 | 12/2021 | Tran et al. |
| 11,249,544 B2 | 2/2022 | Sicconi et al. |
| 11,258,874 B2 | 2/2022 | Walsh et al. |
| 11,367,323 B1 * | 6/2022 | Shahidzadeh .......... G07C 9/215 |
| 11,368,481 B2 | 6/2022 | Kirti et al. |
| 2018/0239959 A1 | 8/2018 | Do et al. |
| 2019/0098037 A1 | 3/2019 | Shenoy, Jr. et al. |
| 2019/0356736 A1 | 11/2019 | Narayanaswamy et al. |
| 2020/0184102 A1 | 6/2020 | Amarendran et al. |

* cited by examiner

SYSTEM FOR SECURED ELECTRONIC DATA ACCESS THROUGH MACHINE-LEARNING BASED ANALYSIS OF COMBINED ACCESS AUTHORIZATIONS

CROSS-REFERENCE TO RELATED APPLICATION

The present application claims priority to and is a continuation application of U.S. patent application Ser. No. 17/725,017 filed on Apr. 20, 2022 of the same title; the contents of which are incorporated herein by reference.

FIELD OF THE INVENTION

The present disclosure embraces a system for secured electronic data access through machine-learning based analysis of combined access authorizations.

BACKGROUND

There is a need for an effective way to secure access to sensitive electronic data.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

A system is provided for secured electronic data access through machine-learning based analysis of combined access authorizations. In particular, the system may maintain an access provisioning database which stores data regarding the data access authorizations that have been granted to one or more third party computing systems or entities. The system may further continuously monitor and aggregate electronic data from one or more electronic data streams and analyze the electronic data to intelligently generate probabilities for future events that create certain combinations of access authorizations that affect the security of the electronic data to which the third party computing systems have authorized access. In this way, the system may provide an effective way to manage access authorizations.

Accordingly, embodiments of the present disclosure provide a system for secured electronic data access through machine-learning based analysis of combined access authorizations, the system comprising a memory device with computer-readable program code stored thereon; a communication device; and a processing device operatively coupled to the memory device and the communication device, wherein the processing device is configured to execute the computer-readable program code to continuously monitor one or more data intelligence feeds; connect to an access authorization database, wherein the access authorization database comprises one or more data records associated with secured data, wherein the one or more data records comprises an indicator of one or more third party systems that are authorized to access the secured data; detect, based on a first third party system being authorized to access a first subset of the secured data and a second third party system being authorized to access a second subset of the secured data, that a combination of the first subset of the secured data and the second subset of the secured data creates an unauthorized combination of secured data; compute, based on the one or more data intelligence feeds and the one or more data records within the access authorization database, a probability score and an impact score associated with a future event, wherein the future event comprises the combination of the first subset of the secured data and the second subset of the secured data; and based on the probability score and the impact score, execute one or more remediation processes on the first subset of the secured data or the second subset of the secured data.

In some embodiments, the processing device is further configured to execute the computer-readable program code to present, on a display of a user computing device, an event dashboard, wherein the event dashboard comprises a graphical user interface configured to display the probability score and the impact score.

In some embodiments, the graphical user interface is further configured to execute a simulation of one or more potential scenarios based on the occurrence of a second set of future events.

In some embodiments, the one or more remediation processes comprises at least one of revocation of authentication credentials, forced encryption of the first subset of secured data or the second subset of secured data, or secure remote wipes of the first third party system or the second third party system.

In some embodiments, the one or more remediation processes are selected based on the probability score and the impact score associated with the future event.

In some embodiments, the one or more data records within the access authorization database comprise classifications of each subset of secured data.

In some embodiments, continuously monitoring the one or more data intelligence feeds comprises analyzing the one or more data intelligence feeds using one or more machine learning algorithms, the one or more machine learning algorithms comprising a natural language processing-based algorithm.

Embodiments of the present disclosure also provide a computer program product for secured electronic data access through machine-learning based analysis of combined access authorizations, the computer program product comprising at least one non-transitory computer readable medium having computer-readable program code portions embodied therein, the computer-readable program code portions comprising executable portions for continuously monitoring one or more data intelligence feeds; connecting to an access authorization database, wherein the access authorization database comprises one or more data records associated with secured data, wherein the one or more data records comprises an indicator of one or more third party systems that are authorized to access the secured data; detecting, based on a first third party system being authorized to access a first subset of the secured data and a second third party system being authorized to access a second subset of the secured data, that a combination of the first subset of the secured data and the second subset of the secured data creates an unauthorized combination of secured data; computing, based on the one or more data intelligence feeds and the one or more data records within the access authorization database, a probability score and an impact score associated with a future event, wherein the future event comprises the combination of the first subset of the secured data and the second subset of the secured data; and based on the probability score and the impact score, executing one or more remediation processes on the first subset of the secured data or the second subset of the secured data.

In some embodiments, the computer-readable program code portions further comprise executable portions for presenting, on a display of a user computing device, an event dashboard, wherein the event dashboard comprises a graphical user interface configured to display the probability score and the impact score.

In some embodiments, the graphical user interface is further configured to execute a simulation of one or more potential scenarios based on the occurrence of a second set of future events.

In some embodiments, the one or more remediation processes comprises at least one of revocation of authentication credentials, forced encryption of the first subset of secured data or the second subset of secured data, or secure remote wipes of the first third party system or the second third party system.

In some embodiments, the one or more remediation processes are selected based on the probability score and the impact score associated with the future event.

In some embodiments, the one or more data records within the access authorization database comprise classifications of each subset of secured data.

Embodiments of the present disclosure also provide a computer-implemented method for secured electronic data access through machine-learning based analysis of combined access authorizations, the computer-implemented method comprising continuously monitoring one or more data intelligence feeds; connecting to an access authorization database, wherein the access authorization database comprises one or more data records associated with secured data, wherein the one or more data records comprises an indicator of one or more third party systems that are authorized to access the secured data; detecting, based on a first third party system being authorized to access a first subset of the secured data and a second third party system being authorized to access a second subset of the secured data, that a combination of the first subset of the secured data and the second subset of the secured data creates an unauthorized combination of secured data; computing, based on the one or more data intelligence feeds and the one or more data records within the access authorization database, a probability score and an impact score associated with a future event, wherein the future event comprises the combination of the first subset of the secured data and the second subset of the secured data; and based on the probability score and the impact score, executing one or more remediation processes on the first subset of the secured data or the second subset of the secured data.

In some embodiments, the computer-implemented method further comprises presenting, on a display of a user computing device, an event dashboard, wherein the event dashboard comprises a graphical user interface configured to display the probability score and the impact score.

In some embodiments, the graphical user interface is further configured to execute a simulation of one or more potential scenarios based on the occurrence of a second set of future events.

In some embodiments, the one or more remediation processes comprises at least one of revocation of authentication credentials, forced encryption of the first subset of secured data or the second subset of secured data, or secure remote wipes of the first third party system or the second third party system.

In some embodiments, the one or more remediation processes are selected based on the probability score and the impact score associated with the future event.

In some embodiments, the one or more data records within the access authorization database comprise classifications of each subset of secured data.

In some embodiments, continuously monitoring the one or more data intelligence feeds comprises analyzing the one or more data intelligence feeds using one or more machine learning algorithms, the one or more machine learning algorithms comprising a natural language processing-based algorithm.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
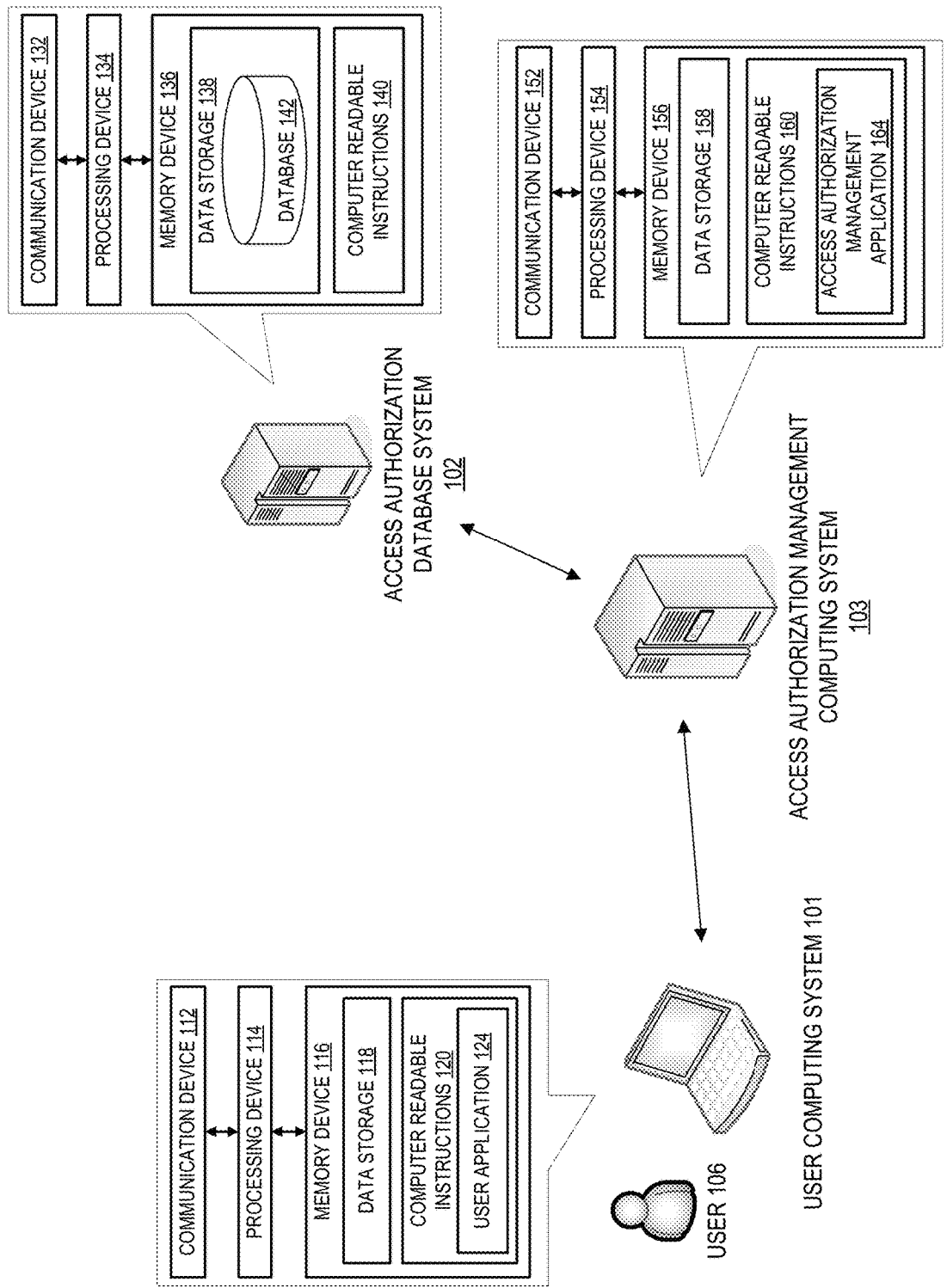
Figure 2:
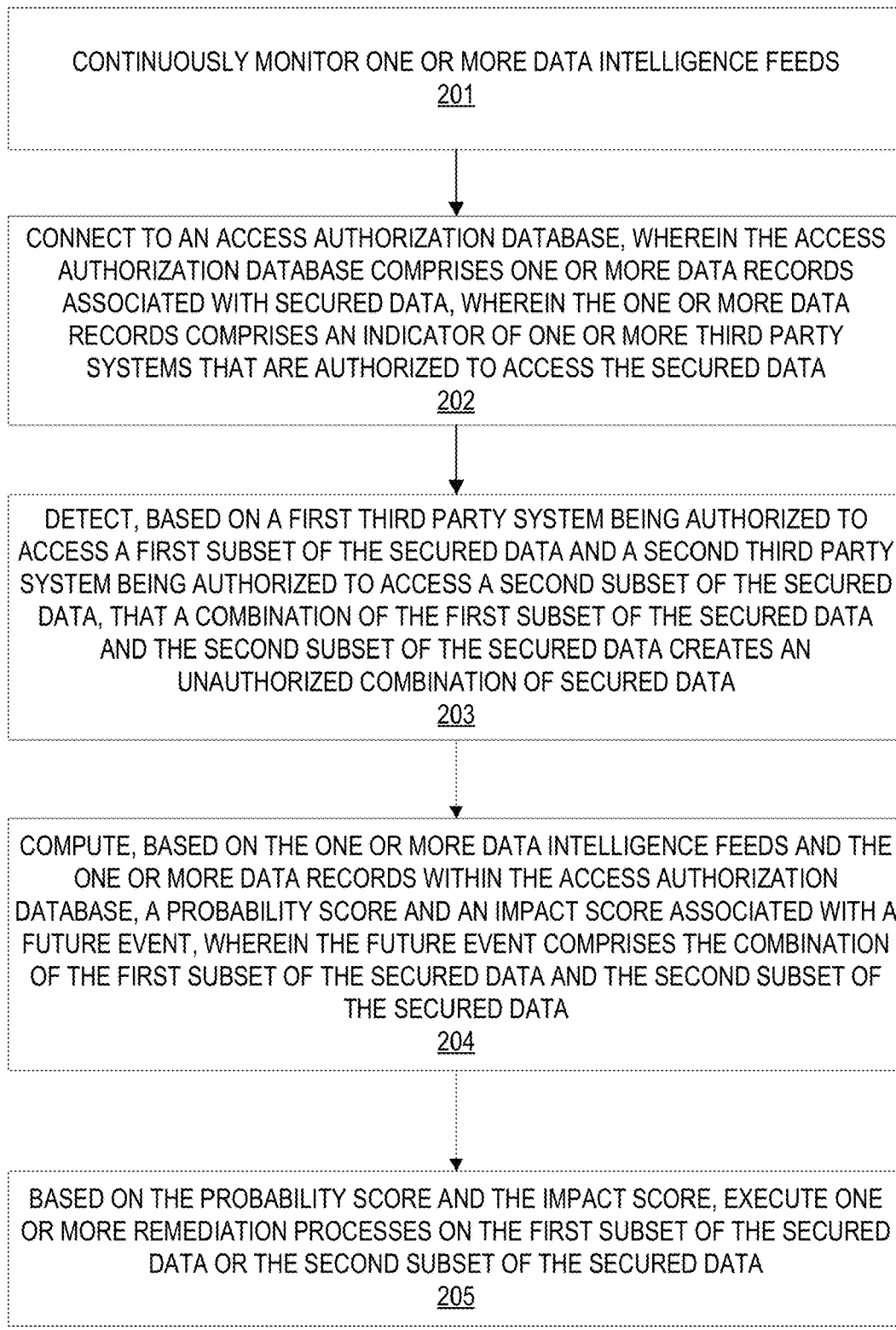

Having thus described embodiments of the invention in general terms, reference will now be made to the accompanying drawings, wherein:

FIG. 1 illustrates an operating environment for the access authorization management system, in accordance with one embodiment of the present disclosure;

FIG. 2 is a flow diagram illustrating a process for secured electronic data access through machine-learning based analysis of combined access authorizations, in accordance with one embodiment of the present disclosure.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

"Entity" as used herein may refer to an individual or an organization that owns and/or operates an online system of networked computing devices, systems, and/or peripheral devices on which the system described herein is implemented. The entity may be a business organization such as a financial institution, a non-profit organization, a government organization, and the like, which may routinely use various types of applications within its enterprise environment to accomplish its organizational objectives.

"The system" or "entity system" as used herein may refer to the computing systems, devices, software, applications, communications hardware, and/or other resources used by the entity to perform the functions as described herein. Accordingly, the entity system may comprise desktop computers, laptop computers, servers, Internet-of-Things ("IoT") devices, networked terminals, mobile smartphones, smart devices (e.g., smart watches), network connections, and/or other types of computing systems or devices and/or peripherals along with their associated applications.

"Computing system" or "computing device" as used herein may refer to a networked computing device within the entity system. The computing system may include a processor, a non-transitory storage medium, a communications device, and a display. The computing system may be configured to support user logins and inputs from any combination of similar or disparate devices. Accordingly, the computing system may be a portable electronic device such as a smartphone, tablet, single board computer, smart device, or laptop. In other embodiments, the computing system may be a stationary unit such as a personal desktop computer, networked terminal, IoT device, or the like.

"User" as used herein may refer to an individual who may interact with the entity system to access the functions therein. Accordingly, the user may be an agent, employee, associate, contractor, or other authorized party who may access, use, administrate, maintain, and/or manage the computing systems within the entity system. In other embodiments, "user" as used herein may refer to a computerized resource (e.g., a computing system, application, system process, or the like) that may access other resources as part of its operations.

Accordingly, as used herein the term "user device" or "mobile device" may refer to mobile phones, personal computing devices, tablet computers, wearable devices, and/or any portable electronic device capable of receiving and/or storing data therein.

"Resource" as used herein may refer to tangible or intangible objects which may be held, owned, or used by a user and/or the entity. In particular, "resource" as used herein may refer to computing resources such as hardware (e.g., computing systems, hardware components, servers, wireless smart devices, IoT devices, or the like) and/or software (e.g., applications, operating systems, data repositories, or the like).

"Natural language processing" or "NLP" as used herein may refer to artificial intelligence technology that may allow computing devices to process and analyze language data. "Natural language understanding" or "NLU" as used herein may refer to the process by which a computing device (e.g., a device with NLP functionality) understands or comprehends natural language.

An entity may selectively grant, to one or more third party entities or computing systems, secure access to a set or subset of data (which may be referred to herein as "secured data") stored within the entity's network environment. For instance, the entity system may provision authentication credentials (e.g., a username and/or password, PIN, secure token, certificate, or the like) that a first third party entity (e.g., a customer of the entity) may use to access the secured data associated with the first third party entity (e.g. a first subset of secured data associated with the first third party entity, which may include a history of interactions or transactions between the customer and the entity). Meanwhile, a second third party entity may be provisioned authentication credentials to access a second subset of secured data associated with the second third party entity.

That said, the entity may wish to prevent certain combinations of access authorizations that may affect the security of the secured data stored within the entity's network environment. In an exemplary embodiment, the first third party entity and second third party entity may merge to form a single entity (e.g., a merged third party entity). In such a scenario, the merged third party entity would have access to both the first subset of secured data and the second subset of secured data. In combination, the first subset of secured data and the second subset of secured data may contain sensitive data (e.g., PII or proprietary data) that may create a security issue regarding access to both subsets of secured data (e.g., a conflict of interest resulting from access to both subsets).

Accordingly, the system may store and maintain a database of access authorizations granted to the various third party entities with which the entity is associated (which may be referred to herein as an "access authorization database"). The access authorization database may store information (e.g., data and/or metadata) regarding the secured data to which access has been authorized (e.g., the categories or classifications of secured data, the contents of the secured data, the date on which access authorizations were granted, limitations on the access authorizations such as scope or timeframes, and the like) along with information regarding the third party entities that have been provided with access to the secured data and/or subsets of the secured data.

The system may further comprise a data aggregation engine that may intelligently monitor and gather data to be used in predictive analytics on future events that may affect the security of the secured data stored in the entity network. In this regard, the data aggregation engine may pull intelligence data from one or more intelligence data feeds (e.g., market analysis data feeds, news feeds, legal databases, and the like). In this regard, the intelligence data may include historical data and/or current data regarding events involving third party entities (e.g., mergers, data sharing arrangements, or the like). The system may then analyze the intelligence data and the data stored within the access authorization database using on one or more machine learning algorithms (e.g., NLP-based algorithms) to generate one or more predicted probability scores of a future event that may affect the security of the secured data (e.g., a merger involving third party entities), where higher probability scores indicate a higher probability of the occurrence of the future event.

The system may further analyze the nature of the potential effect of a particular event on the security of the secured data. For instance, the system may detect that a merger of a first third party entity and a second third party entity may result in a compromise in security (e.g., a single entity being unintentionally granted access to particular subsets of secured data). In this regard, the system may compute an impact score associated with the compromise in security, where the impact score indicates the degree of impact that the future event would have on the security of the secured data. Accordingly, relatively higher impact scores may indicate a greater impact on the security of the secured data, whereas relatively lower impact scores may indicate a lower impact on the security of the secured data.

In some embodiments, the system may use the historical data regarding tracked events to refine the prediction processes through machine learning algorithms. In this regard, the system may assess the accuracy of the computed probability scores by using real world event data. For instance, if the system computed a relatively high probability score for a certain future event and said future event does occur, the system may increase the confidence level of the computed probability score. On the other hand, if the future event does not occur for a threshold length of time, the system may decrease the confidence level of the computed probability score, which may lead the system to compute lower probability scores for a particular event given the same inputs. In this way, the system may dynamically improve the accuracy of the computed probability scores over time.

Based on the computed probability scores and impact scores, the system may use an orchestration engine to intelligently create and execute one or more remediation processes to protect the secured data. For instance, the system may detect that the probability score associated with a future event (e.g., a merger of the first third party entity and the second third party entity) exceeds a predetermined probability score threshold and the impact score associated with the future event exceeds a predetermined impact score threshold. In some embodiments, the system may dynamically adjust the values of the probability score threshold based on the impact score associated with a particular event, or conversely adjust the values of the impact score threshold based on the probability score associated with the event. For instance, if a particular event is associated with a relatively high impact score (e.g., the event would create a large disruption in the security of the secured data), the system may set a relatively lower probability score threshold associated with the event to account for the high impact score. Conversely, if a particular event is associated with a high probability score (e.g., the event has a high chance of occurring in the future), the system may set a relatively lower impact score threshold associated with the event.

Upon detecting that the probability score associated with the event meets or exceeds the probability score threshold and the impact score meets or exceeds the impact score threshold, the system may initiate one or more remediation processes with respect to the secured data that is associated with the event. For instance, the event may affect the first subset of secured data and the second subset of secured data. In such a scenario, the one or more remediation processes may include transmitting a notification to a user computing system within the entity network that a potential security issue may exist with respect to the event and/or the secured data, revocation of access authorizations for the first subset of secured data and/or the second subset of secured data, network segmentation, forced encryption of the first subset of secured data and/or the second subset of secured data, secure wiping of one or more computing systems hosting the first subset of secured data and/or the second subset of secured data, and the like. In some embodiments, the system may dynamically select a remediation process based on the computed impact score and/or the probability score. For instance, if the impact score and/or the probability score are relatively low, the system may transmit notifications regarding the potential event to one or more users within the entity network (e.g., agents or employees of the entity). On the other hand, if the impact score and/or the probability score associated with the event are relatively high, the system may escalate to a higher level of remediation process (e.g., wiping the affected devices).

In some embodiments, the system may further comprise an event dashboard that may be presented to one or more users within the entity network. In this regard, the event dashboard may comprise a graphical user interface that may be presented on the display devices of one or more user computing systems within the entity network. The event dashboard may be configured to allow users to view information such as access authorization information (e.g., the sets or subsets of secured data to which authorized third party entities have access, the current impact levels associated with the authorizations, and the like) impact scores and/or probability scores associated with predicted future events, news regarding certain events (e.g., mergers of entities), and the like. Accordingly, the event dashboard may allow the user to execute simulations or forecasting of various potential scenarios based on the occurrence of one or more future events, along with the potential impacts of the scenarios on the security posture of the secured data.

The system as described herein confers a number of technological advantages over conventional data management systems. For instance, by intelligently identifying possible future events that may lead to unauthorized combinations of access authorizations and using the orchestration engine to automatically execute remediation processes, the system may efficiently and expediently prevent and/or correct the compromise of sensitive data within the network environment. Furthermore, by providing an event dashboard for executing simulations of potential scenarios, the system improves the user experience of the user when examining the potential impacts of certain scenarios based on predicted future events.

Turning now to the figures, FIG. 1 illustrates an operating environment 100 for the access authorization management system, in accordance with one embodiment of the present disclosure. In particular, FIG. 1 illustrates an access authorization management computing system 103 in operative communication with a user computing system 101 and access authorization database system 102 over a network. In such a configuration, the access authorization management computing system 103 may transmit data to and receive data from computing systems over the network, including the user computing system 101 and/or the access authorization database system 102.

It should be understood that FIG. 1 illustrates only an exemplary embodiment of the operating environment 100, and it will be appreciated that the operating environment 100 may comprise fewer or greater numbers of computing systems than what is depicted in FIG. 1. For example, though FIG. 1 depicts a single access authorization database system 102, the operating environment may comprise multiple networked databases that may be used to store data regarding access authorizations. It should also be appreciated that one or more functions of the systems, devices, or servers as depicted in FIG. 1 may be combined into a single system, device, or server and/or performed by other computing systems. For instance, though the access authorization management computing system 103 and the access authorization database system 102 are depicted as separate systems, the functions of both systems may in some embodiments be combined into a single computing system. Furthermore, the functions of a single system, device, or server as depicted in FIG. 1 may be distributed across multiple computing systems.

The network may be a system specific distributive network receiving and distributing specific network feeds and identifying specific network associated triggers. The network may include one or more cellular radio towers, antennae, cell sites, base stations, telephone networks, cloud networks, radio access networks (RAN), Wi-Fi networks, or the like. Additionally, the network may also include a global area network (GAN), such as the Internet, a wide area network (WAN), a local area network (LAN), or any other type of network or combination of networks. Accordingly, the network may provide for wireline, wireless, or a combination wireline and wireless communication between devices on the network.

As illustrated in FIG. 1, the access authorization management computing system 103 may be a computing system that manages data access authorizations and generates predictions of future events that may affect the secured data stored within the network. Accordingly, the access authorization management computing system 103 may comprise a processing device 154 operatively coupled to a communication device 152 and a memory device 156. The memory device 156 may comprise data storage 158 and computer readable instructions 160 stored thereon, where the computer readable instructions 160 may comprise an access authorization management application 164. The access authorization management application 164 may, when executed by the processor 154 of the access authorization management computing system 103, cause the processor 154 to perform monitoring of intelligence data feeds, management of data access authorizations for third party entities, analysis of the data feeds and access authorizations using machine learning, generation of impact scores and/or probability scores, and other functions as described elsewhere herein.

As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The communication device 152, and other communication devices as described herein, may comprise a wireless local area network (WLAN) such as Wi-Fi based on the Institute of Electrical and Electronics Engineers' (IEEE) 802.11 standards, Bluetooth short-wavelength UHF radio waves in the ISM band from 2.4 to 2.485 GHz or other wireless access technology. Alternatively or in addition to the wireless interface, the systems described herein may also include a communication interface device that may be connected by a hardwire connection to the resource distribution device. The interface device may comprise a connector such as a USB, SATA, PATA, SAS or other data connector for transmitting data to and from the respective computing system.

As further illustrated in FIG. 1, the user computing system 101 may be in operative communication with the access authorization database system 102 and/or the access authorization management computing system 103. The user computing system 101 may be a computing system owned and/or operated by a user 106, where the user may be an individual who is associated with the entity (e.g., an authorized user on the entity's network such as an agent, employee, or customer of the entity). That said, it is within the scope of the disclosure for the user 106 to be a nonhuman user (e.g., an application).

The user 106 may, using the user computing system 101, receive and/or transmit various types of network communications with the various computing systems in the network environment. Accordingly, the user computing system 101 may comprise a communication device 112, a processing device 114, and a memory device 116. In some embodiments, the user computing system 101 may comprise hardware and/or software components that allow the user computing system 101 to interface with the user 106. In such embodiments, the user computing system 101 may comprise a user interface comprising one or more input devices (e.g., a keyboard, keypad, microphone, mouse, tracking device, biometric readers, capacitive sensors, or the like) and/or output devices (e.g., a display such as a monitor, projector, headset, touchscreen, and/or auditory output devices such as speakers, headphones, or the like).

The memory device 116 of the user computing system 101 may further comprise data storage 118 and computer-readable instructions 120 stored thereon. The computer-readable instructions 120 may comprise a user application 124. The user application 124 may be a software application that the user 106 may use to access and view the event dashboard hosted on the access authorization management computing system 103. Accordingly, in some embodiments, the user application 124 may be an application provided by the entity. In other embodiments, the user application 124 may be a third party application such as a web browser. In such embodiments, the event dashboard may be implemented as a web-based application or site hosted by the access authorization management computing system 103.

As further illustrated in FIG. 1, the access authorization database system 102 may be a computing system that stores the access authorizations provided to certain computing systems or entities as described herein. Accordingly, the access authorization database system 102 may comprise a communication device 132, a processing device 134, and a memory device 136, where the processing device 134 is operatively coupled to the communication device 132 and the memory device 136. The processing device 134 uses the communication device 132 to communicate with the network and other devices on the network. As such, the communication device 132 generally comprises a modem, antennae, Wi-Fi or Ethernet adapter, radio transceiver, or other device for communicating with other devices on the network.

The memory device 136 comprises computer-readable instructions 140 and data storage 138. The data storage 138 of the access authorization database system 102 may comprise a database 142, where the database 142 is an access authorization database that may contain information such as identifiers of the sets or subsets of secured data to which access has been provisioned, the classifications of sets or subsets of secured data, identifiers of computing system or entities that have access to the sets or subsets of secured data, and the like. In some embodiments, the database 142 may further store probability scores and/or impact scores that have been computed by the access authorization management computing system 103.

The communication devices as described herein may comprise a wireless local area network (WLAN) such as Wi-Fi based on the Institute of Electrical and Electronics Engineers' (IEEE) 802.11 standards, Bluetooth short-wavelength UHF radio waves in the ISM band from 2.4 to 2.485 GHz or other wireless access technology. Alternatively or in addition to the wireless interface, the distributed register node 103 may also include a communication interface device that may be connected by a hardwire connection to the resource distribution device. The interface device may comprise a connector such as a USB, SATA, PATA, SAS or other data connector for transmitting data to and from the respective computing system.

The computing systems described herein may each further include a processing device communicably coupled to devices as a memory device, output devices, input devices, a network interface, a power source, a clock or other timer, a camera, a positioning system device, a gyroscopic device, one or more chips, and the like.

In some embodiments, the computing systems may access one or more databases or datastores (not shown) to search for and/or retrieve information related to the service provided by the entity. The computing systems may also access a memory and/or datastore local to the various computing systems within the operating environment 100.

The processing devices as described herein may include functionality to operate one or more software programs or applications, which may be stored in the memory device. For example, a processing device may be capable of operating a connectivity program, such as a web browser application. In this way, the computing systems may transmit and receive web content, such as, for example, product valuation, service agreements, location-based content, and/or other web page content, according to a Wireless Application Protocol (WAP), Hypertext Transfer Protocol (HTTP), and/or the like.

A processing device may also be capable of operating applications. The applications may be downloaded from a server and stored in the memory device of the computing systems. Alternatively, the applications may be pre-installed and stored in a memory in a chip.

The chip may include the necessary circuitry to provide integration within the devices depicted herein. Generally, the chip will include data storage which may include data associated with the service that the computing systems may be communicably associated therewith. The chip and/or data storage may be an integrated circuit, a microprocessor, a system-on-a-chip, a microcontroller, or the like. In this way, the chip may include data storage. Of note, it will be apparent to those skilled in the art that the chip functionality may be incorporated within other elements in the devices. For instance, the functionality of the chip may be incorporated within the memory device and/or the processing device. In a particular embodiment, the functionality of the chip is incorporated in an element within the devices. Still further, the chip functionality may be included in a removable storage device such as an SD card or the like.

A processing device may be configured to use the network interface to communicate with one or more other devices on a network. In this regard, the network interface may include an antenna operatively coupled to a transmitter and a receiver (together a "transceiver"). The processing device may be configured to provide signals to and receive signals from the transmitter and receiver, respectively. The signals may include signaling information in accordance with the air interface standard of the applicable cellular system of the wireless telephone network that may be part of the network. In this regard, the computing systems may be configured to operate with one or more air interface standards, communication protocols, modulation types, and access types. By way of illustration, the devices may be configured to operate in accordance with any of a number of first, second, third, fourth, and/or fifth-generation communication protocols and/or the like. For example, the computing systems may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, with fifth-generation (5G) wireless communication protocols, or the like. The devices may also be configured to operate in accordance with non-cellular communication mechanisms, such as via a wireless local area network (WLAN) or other communication/data networks.

The network interface may also include an application interface in order to allow a user or service provider to execute some or all of the above-described processes. The application interface may have access to the hardware, e.g., the transceiver, and software previously described with respect to the network interface. Furthermore, the application interface may have the ability to connect to and communicate with an external data storage on a separate system within the network.

The devices may have an interface that includes user output devices and/or input devices. The output devices may include a display (e.g., a liquid crystal display (LCD) or the like) and a speaker or other audio device, which are operatively coupled to the processing device. The input devices, which may allow the devices to receive data from a user, may include any of a number of devices allowing the devices to receive data from a user, such as a keypad, keyboard, touch-screen, touchpad, microphone, mouse, joystick, other pointer device, button, soft key, and/or other input device(s).

The devices may further include a power source. Generally, the power source is a device that supplies electrical energy to an electrical load. In some embodiment, power source may convert a form of energy such as solar energy, chemical energy, mechanical energy, or the like to electrical energy. Generally, the power source may be a battery, such as a lithium battery, a nickel-metal hydride battery, or the like, that is used for powering various circuits, e.g., the transceiver circuit, and other devices that are used to operate the devices. Alternatively, the power source may be a power adapter that can connect a power supply from a power outlet to the devices. In such embodiments, a power adapter may be classified as a power source "in" the devices.

As described above, the computing devices as shown in FIG. 1 may also include a memory device operatively coupled to the processing device. As used herein, "memory" may include any computer readable medium configured to store data, code, or other information. The memory device may include volatile memory, such as volatile Random Access Memory (RAM) including a cache area for the temporary storage of data. The memory device may also include non-volatile memory, which can be embedded and/or may be removable. The non-volatile memory may additionally or alternatively include an electrically erasable programmable read-only memory (EEPROM), flash memory or the like.

The memory device may store any of a number of applications or programs which comprise computer-executable instructions/code executed by the processing device to implement the functions of the devices described herein.

The computing systems may further comprise a gyroscopic device. The positioning system, input device, and the gyroscopic device may be used in correlation to identify phases within a service term.

Each computing system may also have a control system for controlling the physical operation of the device. The control system may comprise one or more sensors for detecting operating conditions of the various mechanical and electrical systems that comprise the computing systems or of the environment in which the computing systems are used. The sensors may communicate with the processing device to provide feedback to the operating systems of the device. The control system may also comprise metering devices for measuring performance characteristics of the computing systems. The control system may also comprise controllers such as programmable logic controllers (PLC), proportional integral derivative controllers (PID) or other machine controllers. The computing systems may also comprise various electrical, mechanical, hydraulic, or other systems that perform various functions of the computing systems. These systems may comprise, for example, electrical circuits, motors, compressors, or any system that enables functioning of the computing systems.

FIG. 2 is a flow diagram illustrating a process flow 200 for secured electronic data access through machine-learning based analysis of combined access authorizations. The process begins at block 201, where the system continuously monitors one or more data intelligence feeds. In this regard, the system may use open source intelligence processes to gather various types of data regarding potential future events, where such processes may include crawling the web using NLP-based algorithms, receiving data from news feeds, market analysis databases, legal records, and the like. The system may then analyze the data collected from the intelligence gathering processes to predict the likelihood of the occurrence of certain events, as will be described in further detail below.

The process continues to block 202, wherein the system connects to an access authorization database, wherein the access authorization databases comprises one or more data records associated with the secured data, wherein the one or more data records comprises an indicator of one or more third party systems that are authorized to access the secured data. The one or more data records may contain data and/or metadata regarding the secured data to which third party systems my have access. Accordingly, the data records may include information such as the nature of the secured data (e.g., a classification of the secured data), an identification of third party systems and/or entities that have been provided access to at least a portion of the data along with which subsets of the secured data each third party system or entity is authorized to access, and the like.

The process continues to block 203, wherein the system detects, based on a first third party system being authorized to access a first subset of the secured data and a second third party system being authorized to access a second subset of the secured data, that a combination of the first subset of the secured data and the second subset of the secured data creates an unauthorized combination of secured data. In this regard, shared access to a sum of the first subset and a second subset of secured data may result in unintended consequences. For example, if the first subset of secured data includes HR information and the second subset of secured data includes information about pending legal cases. In such an embodiment, if a single entity were to have access to both subsets of secured data, the combination may create a conflict of interest.

The process continues to block 204, wherein the system computes, based on the one or more data intelligence feeds and the one or more data records within the access authorization database, a probability score and an impact score associated with a future event, wherein the future event comprises the combination of the first subset of the secured data and the second subset of the secured data. For instance, the system may examine the data feeds to determine the likelihood of an organizational merger of the first third party entity and the second third party entity, where the first third party entity may be granted access to a certain portion (e.g., the first subset) of secured data (e.g., customer information) and the second third party entity may be granted access to another portion (e.g., the second subset) of the secured data (e.g., information about organizational processes of the entity). Accordingly, the system may detect that a news article containing certain key terms (e.g., "merger," "restructuring," or the like, along with the third party entities). Based on detecting the key terms, the system may determine that there is an increased likelihood of a merger including the first third party entity and the second third party entity. Accordingly, the system may increase the probability score associated with the future event. Furthermore, the system may assess the potential impact that the future event would have on the security of the secured data. For instance, the system may detect that the unauthorized combination of the subsets of data would cause a high amount of damage to the security or organizational interests of the entity. Accordingly, the system may increase the impact score associated with the future event.

The process concludes at block 205, wherein the system, based on the probability score and the impact score, executes one or more remediation processes on the first subset of the secured data or the second subset of the secured data. The remediation processes may include one or more of various steps to protect the secured data, such as altering or revoking authentication/authorization credentials, forcing third party systems to reauthenticate before accessing the data, force encrypting the data on devices that have access to the data, securely performing a remote wipe of devices that have access to the data, and the like. In some embodiments, the system may intelligently select the remediation process based on the impact score and/or the probability score associated with a particular event and/or subset of secured data. For instance, events that are associated with relatively low impact scores and/or probability scores may be remediated using a less invasive process than events that are associated with relatively higher impact scores and/or probability scores.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EEPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for secured electronic data access through machine-learning based analysis of combined access authorizations, the system comprising:
   a memory device with computer-readable program code stored thereon;
   a communication device; and
   a processing device operatively coupled to the memory device and the communication device, wherein the processing device is configured to execute the computer-readable program code to:
   access one or more data intelligence feeds;
   connect to an access authorization database, wherein the access authorization database comprises one or more data records associated with secured data, wherein the one or more data records comprises an indicator of one or more third party systems that are authorized to access the secured data;
   detect, based on a first third party system being authorized to access a first subset of the secured data and a second third party system being authorized to access a second subset of the secured data, that a combination of the first subset of the secured data and the second subset of the secured data creates an unauthorized combination of secured data;
   compute, based on the one or more data intelligence feeds and the one or more data records within the access authorization database, a probability score and an impact score associated with a future event, wherein the future event comprises the combination of the first subset of the secured data and the second subset of the secured data; and
   based on the probability score and the impact score, execute one or more remediation processes on the first subset of the secured data or the second subset of the secured data.

2. The system according to claim 1, wherein the processing device is further configured to execute the computer-readable program code to present, on a display of a user computing device, an event dashboard, wherein the event dashboard comprises a graphical user interface configured to display the probability score and the impact score.

3. The system according to claim 2, wherein the graphical user interface is further configured to execute a simulation of one or more potential scenarios based on the occurrence of a second set of future events.

4. The system according to claim 1, wherein the one or more remediation processes comprises at least one of revocation of authentication credentials, forced encryption of the first subset of secured data or the second subset of secured data, or secure remote wipes of the first third party system or the second third party system.

5. The system according to claim 4, wherein the one or more remediation processes are selected based on the probability score and the impact score associated with the future event.

6. The system according to claim 1, wherein the one or more data records within the access authorization database comprise classifications of each subset of secured data.

7. The system according to claim 1 further comprising analyzing the one or more data intelligence feeds using one or more machine learning algorithms, the one or more machine learning algorithms comprising a natural language processing-based algorithm.

8. A computer program product for secured electronic data access through machine-learning based analysis of combined access authorizations, the computer program product comprising at least one non-transitory computer readable medium having computer-readable program code portions embodied therein, the computer-readable program code portions comprising executable portions for:
- access one or more data intelligence feeds;
- connecting to an access authorization database, wherein the access authorization database comprises one or more data records associated with secured data, wherein the one or more data records comprises an indicator of one or more third party systems that are authorized to access the secured data;
- detecting, based on a first third party system being authorized to access a first subset of the secured data and a second third party system being authorized to access a second subset of the secured data, that a combination of the first subset of the secured data and the second subset of the secured data creates an unauthorized combination of secured data;
- computing, based on the one or more data intelligence feeds and the one or more data records within the access authorization database, a probability score and an impact score associated with a future event, wherein the future event comprises the combination of the first subset of the secured data and the second subset of the secured data; and
- based on the probability score and the impact score, executing one or more remediation processes on the first subset of the secured data or the second subset of the secured data.

9. The computer program product of claim 8, wherein the computer-readable program code portions further comprise executable portions for presenting, on a display of a user computing device, an event dashboard, wherein the event dashboard comprises a graphical user interface configured to display the probability score and the impact score.

10. The computer program product of claim 9, wherein the graphical user interface is further configured to execute a simulation of one or more potential scenarios based on the occurrence of a second set of future events.

11. The computer program product of claim 8, wherein the one or more remediation processes comprises at least one of revocation of authentication credentials, forced encryption of the first subset of secured data or the second subset of secured data, or secure remote wipes of the first third party system or the second third party system.

12. The computer program product of claim 11, wherein the one or more remediation processes are selected based on the probability score and the impact score associated with the future event.

13. The computer program product of claim 8, wherein the one or more data records within the access authorization database comprise classifications of each subset of secured data.

14. A computer-implemented method for secured electronic data access through machine-learning based analysis of combined access authorizations, the computer-implemented method comprising:
- access one or more data intelligence feeds;
- connecting to an access authorization database, wherein the access authorization database comprises one or more data records associated with secured data, wherein the one or more data records comprises an indicator of one or more third party systems that are authorized to access the secured data;
- detecting, based on a first third party system being authorized to access a first subset of the secured data and a second third party system being authorized to access a second subset of the secured data, that a combination of the first subset of the secured data and the second subset of the secured data creates an unauthorized combination of secured data;
- computing, based on the one or more data intelligence feeds and the one or more data records within the access authorization database, a probability score and an impact score associated with a future event, wherein the future event comprises the combination of the first subset of the secured data and the second subset of the secured data; and
- based on the probability score and the impact score, executing one or more remediation processes on the first subset of the secured data or the second subset of the secured data.

15. The computer-implemented method of claim 14, wherein the computer-implemented method further comprises presenting, on a display of a user computing device, an event dashboard, wherein the event dashboard comprises a graphical user interface configured to display the probability score and the impact score.

16. The computer-implemented method of claim 15, wherein the graphical user interface is further configured to execute a simulation of one or more potential scenarios based on the occurrence of a second set of future events.

17. The computer-implemented method of claim 14, wherein the one or more remediation processes comprises at least one of revocation of authentication credentials, forced encryption of the first subset of secured data or the second subset of secured data, or secure remote wipes of the first third party system or the second third party system.

18. The computer-implemented method of claim 17, wherein the one or more remediation processes are selected based on the probability score and the impact score associated with the future event.

19. The computer-implemented method of claim 14, wherein the one or more data records within the access authorization database comprise classifications of each subset of secured data.

20. The computer-implemented method of claim 14 further comprising analyzing the one or more data intelligence feeds using one or more machine learning algorithms, the one or more machine learning algorithms comprising a natural language processing-based algorithm.

* * * * *